United States Patent
Silva et al.

(10) Patent No.: US 7,831,628 B1
(45) Date of Patent: Nov. 9, 2010

(54) SYSTEM AND METHOD FOR MANAGEMENT OF BUILDING DEPARTMENT SERVICES

(75) Inventors: Carlos Emilio Silva, Doral, FL (US); Jose Javier Jones, Miami Lakes, FL (US)

(73) Assignee: Osiris Quintana, Hialeah, FL (US)

( * ) Notice: Subject to any disclaimer, the term of this patent is extended or adjusted under 35 U.S.C. 154(b) by 360 days.

(21) Appl. No.: 10/908,938

(22) Filed: Jun. 1, 2005

(51) Int. Cl.
G06F 17/30 (2006.01)
G06G 7/00 (2006.01)

(52) U.S. Cl. ..................... 707/802; 705/400
(58) Field of Classification Search .............. None
See application file for complete search history.

(56) References Cited

U.S. PATENT DOCUMENTS

| | | | | |
|---|---|---|---|---|
| 4,955,405 | A * | 9/1990 | Glick et al. | 137/234.6 |
| 5,818,737 | A * | 10/1998 | Orr et al. | 703/6 |
| 5,941,034 | A * | 8/1999 | Frankfurt | 52/236.3 |
| 6,907,304 | B1 * | 6/2005 | Hintz et al. | 700/99 |
| 6,944,770 | B2 * | 9/2005 | Henderson et al. | 713/189 |
| 7,346,519 | B2 * | 3/2008 | Carr et al. | 705/1 |
| 2001/0032094 | A1 | 10/2001 | Ghosh et al. | |
| 2001/0032135 | A1 * | 10/2001 | Heisler et al. | 705/14 |
| 2002/0035408 | A1 * | 3/2002 | Smith | 700/97 |
| 2002/0178229 | A1 * | 11/2002 | Sinha et al. | 709/206 |
| 2002/0188845 | A1 * | 12/2002 | Henderson et al. | 713/168 |
| 2003/0055669 | A1 * | 3/2003 | Ryan et al. | 705/1 |
| 2003/0061266 | A1 * | 3/2003 | Ouchi | 709/106 |
| 2003/0069716 | A1 | 4/2003 | Martinez | |
| 2003/0074244 | A1 * | 4/2003 | Braxton | 705/7 |
| 2003/0101070 | A1 * | 5/2003 | Mahosky et al. | 705/1 |
| 2003/0172087 | A1 | 9/2003 | Godwin | |
| 2003/0177071 | A1 | 9/2003 | Treese et al. | |
| 2004/0003834 | A1 * | 1/2004 | Arnett, Jr. | 134/115 R |
| 2004/0083165 | A1 * | 4/2004 | Lawrence | 705/38 |
| 2004/0128313 | A1 * | 7/2004 | Whyman | 707/103 R |
| 2004/0268129 | A1 * | 12/2004 | Dubuc | 713/176 |
| 2005/0080702 | A1 * | 4/2005 | Modi | 705/36 |
| 2005/0149561 | A1 * | 7/2005 | Hodnett et al. | 707/104.1 |
| 2005/0197962 | A1 * | 9/2005 | Critchfield et al. | 705/53 |
| 2005/0246213 | A1 * | 11/2005 | Vacante et al. | 705/7 |
| 2005/0273346 | A1 * | 12/2005 | Frost | 705/1 |
| 2006/0259419 | A1 * | 11/2006 | Monsen et al. | 705/38 |
| 2008/0255871 | A1 * | 10/2008 | Wenzlau et al. | 705/1 |

OTHER PUBLICATIONS

Guido Bolatto, Adriano Sozaa, Ivano Guana and Maddalena Rusconi; "The Geographic Information System (GIS) of Turin Municipality", Feb. 6, 2000.*

* cited by examiner

*Primary Examiner*—Neveen Abel Jalil
*Assistant Examiner*—Tarek Chbouki
(74) *Attorney, Agent, or Firm*—Malin Haley DiMaggio Bowen & Lhota, P.A.

(57) ABSTRACT

The present invention, known as, a Building Department Integrated Solution (BDIS), provides a new method and system of municipality building information management in a municipality's building department by providing a management tool that provides accuracy and improves efficiency in the processes. The present invention enables users to compile, access, provide and deliver accurate, relevant, secured and required building department data to building officials and/or homeowners/contractors. The present invention enables users to transmit plans, request inspections and retrieve inspection results along with any issued certifications via a network. Inspectors also retrieve and schedule inspection requests via the network. Upon completion of the inspection, inspectors may transmit inspection results and initiate issuance of certificates of completion via the network.

1 Claim, 9 Drawing Sheets

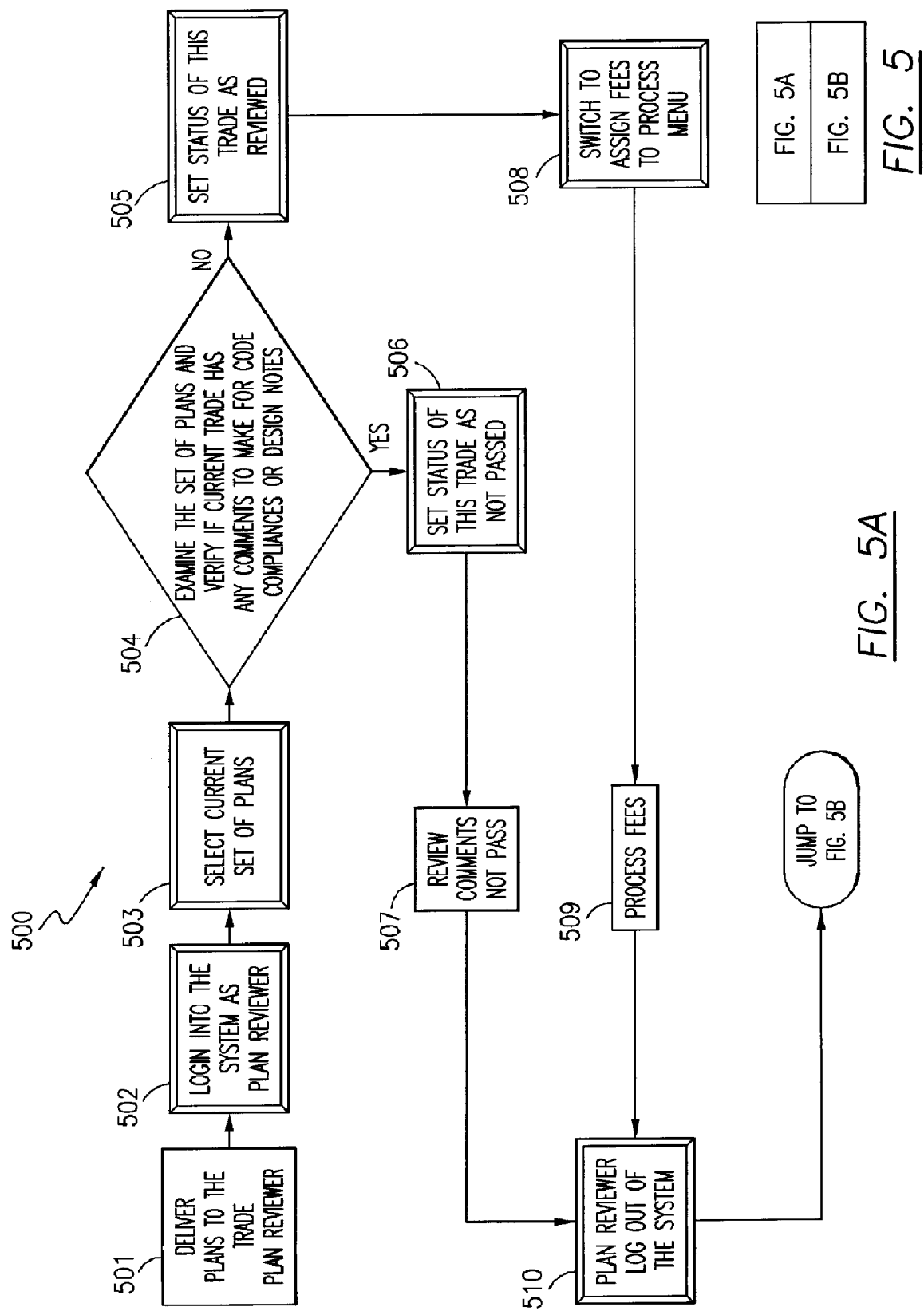

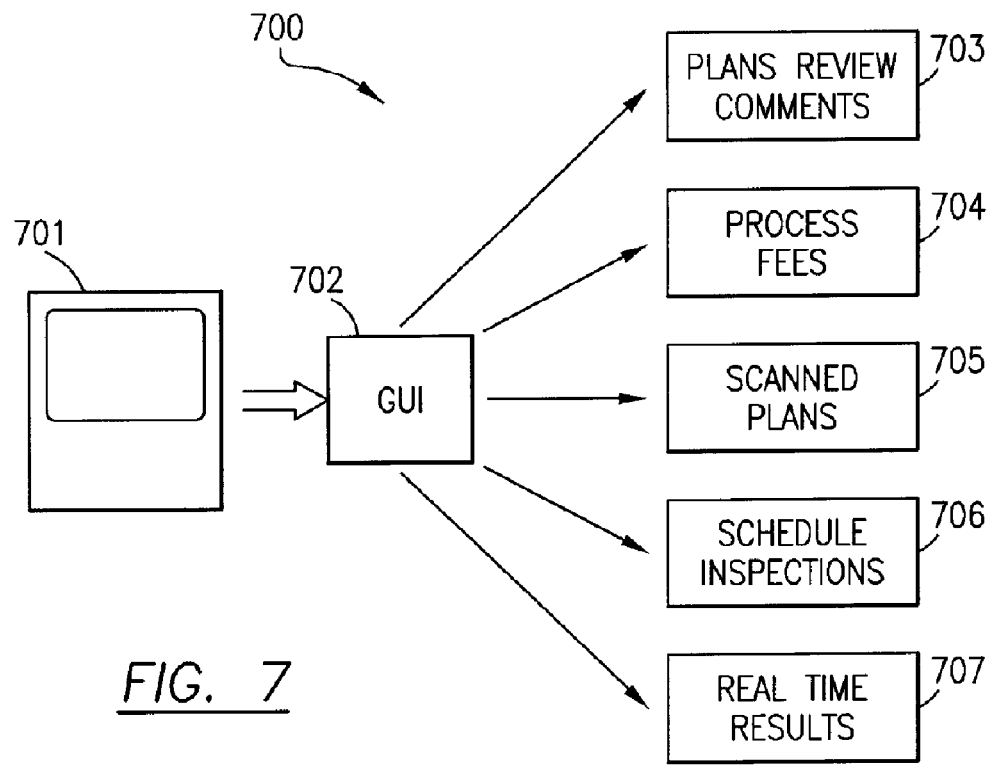

SYSTEM AND METHOD FOR MANAGEMENT OF BUILDING DEPARTMENT SERVICES

FIELD OF THE INVENTION

The present relates to a system and method for municipality building and property information management.

DESCRIPTION OF RELATED ART

Today, most municipal building departments function in the same manner that they did 50 years ago. Many municipalities and counties lack a centralized system that can give officials/citizens accurate and real-time data related to buildings and properties within the municipality. Plans processing, reviews, fees calculations, property information, document storage and handling involve usually inefficient paper based processes. In many instances, involuntary errors occur because of numerous manual calculations using handwritten notes. Inspectors with the building department lose time related to travel to and from the municipal office in order to pick up the inspections schedules, then go back to designated field locations and prepare a report for that inspection. In most of the cases, mistakes occur between transferring data from paper to a computer or a final report by another person. In order to increase efficiency, new ways to mitigate data transfer errors are very necessary.

Another problem facing municipalities and counties involve the massive office space required to store building plans that are routinely filed with the municipality. Hard copy, paper, plans and reviews are very inefficient for many reasons: (1) a municipality bears a considerable cost related to building plan distribution and storage; (2) building plan distribution and tracking can require a significant amount of time; (3) clients or owners must interpret handwritten comments from multiple reviewers; and (4) a set of building plans must be routed thorough multiple departments for approval often leading to delays and lost documents. Some municipalities maintain websites that offer owners/clients the option of consulting on-line information about processes and procedures, but none of them offer the opportunity to view actual submitted plans scanned at the original size, pictures or comments within the inspection records about a designated property.

SUMMARY OF THE INVENTION

The present invention, known as, a Building Department Integrated Solution (BDIS), provides a new method and system of municipal building and property information management that provides a management tool that improves accuracy and efficiency in information flow. The present invention enables users to compile, access, provide and deliver accurate, relevant, secured and required building department data to building officials and/or homeowners/contractors.

The present invention stores, maintains, and provides access to all current data related to a property along with the history of a property including construction plans during the "life" of a property, pictures concerning inspections, code enforcement violations and any other related documents. A relational database stores the building data, where the database may be searched and analyzed for related uses. The database also includes a document archive that stores documents necessary to support the processes mentioned above.

The BDIS includes a unique numbering system that identifies building plans and permits. The BDIS provides safe and secure online access to property data, 24 hours a day, 7 days a week. Each user of the BDIS has a user profile with a specific access rights and all user entries or transactions into the system are stored for future reference. The BDIS reduces costs, improves processes efficiency and integrates the flow of information between municipality officials and owners/contractors. The BDIS also provides municipalities with a full set of services and database applications that: control the information database of the building department; assemble data and documents online; modify data and documents in real time; and deliver any data and documents as required.

The BDIS enables field personnel to use cutting edge technology such as wireless communication devices, i.e., handheld PDA/cellular phone with internet access and camera. The wireless technology enables the field personnel to access any critical data directly at the job site and to supply real-time inspections results to the municipality's building department for owners and/or clients. The BDIS also provides the municipalities with a system that enables department personnel to receive investigate and follow up complaints via a "online complaints and inspection records" feature, and maintain records of those issues related to a designated property. System users may advantageously, from their home or office, have access to scanned plans visualization, schedule inspections and review inspection results. The BDIS advantageously enables the following for the system user: immediate job turnaround; efficient scheduled inspections; and accurate documentation.

The BDIS provides a paper-less solution for handling documents, plans, and multiple reports available for the municipality's building officials. The BDIS includes scanned documents in digital form and thus productively manages large technical documents. Documents and plans are scanned using a large format scanner and uploaded into a system that reduces costs, errors and time. The system establishes a digital process for collaborating on the review stage of proposed construction projects. The BDIS approach provides a level of integration to the review process and creates a more efficient workflow between the owner and the plans examiner.

The BDIS also includes a plan review management feature. The review feature uses existing technology and easy-to-use tools to review plans on screen, perform mark up and revise entire sheet sets. Keeping track of traditional pencil markups on paper sheets is difficult, costly and inefficient. The on-screen plans review approach provides a review cycle which is streamlined and allows project team members to work with a review set just as they do with paper sheet sets. The building official or plan reviewer can systematically walkthrough the revisions, track comments and review status of changes. Municipalities can thus increase productivity, improve efficiency and reduce expenses by: modernizing their plan review process; and using document software such as Adobe PDF Technology (Portable Document Format) that allows reviewers to easily look at a set of plans while preserving the fidelity of the original plans.

The use of the BDIS enables users to access or update critical data in real-time. The BDIS allows municipality officials to access information and ensure that an inspection is never delayed because of the limited access to critical data. By making BDIS available via wireless devices and "thin clients", field inspectors may realize improved time efficiency and improve building department processes that contribute to the success of the municipality management. Having BDIS available at the fingertips, allows field inspectors to respond immediately to owners/contractors and to other municipality-related inquiries on the go.

The implementation of the BDIS creates virtual building departments, i.e., the car, the construction sites. Inspectors now will use their time more productively which translates into improved effectiveness and increased profits. The BDIS provides a powerful tool that allows a field inspector to work without boundaries with tremendous time savings. Existing wireless network technologies such as 3G enables the transfer of data and at rates comparable to wired modems. The BDIS also works across multiple devices such as pocket pc's, PDA's, PDA/cellular phones, wireless data transfer devices, laptops and desk top computers.

The existing manual and paper-based processes presently used are inadequate for the expected level of information flow that plans reviews and field inspections require. The BDIS provides communication from the field, the ability to incorporate photographs into the inspections and code enforcements reports, and to send messages to the field inspectors. The BDIS system also enables field inspectors to update their field device, i.e., PDA, pocket pc, PDA/cellular phone, cellular phone or digital camera, via the internet. Field inspectors, therefore, do not have to report to the main facility to update their systems. The field inspectors' devices may include a browser-based wireless application that enables the transfer of streamline updates and any other necessary data.

In accordance with these and other objects which will become apparent hereinafter, the instant invention will now be described with particular reference to the accompanying drawings.

BRIEF DESCRIPTION OF THE DRAWINGS

FIG. 5A shows an exemplary plans review process for fee assignment according to the present invention.

FIG. 7 depicts an overview of end user templates according to the present invention.

FIG. 8 depicts an exemplary pocket PC application of the present invention.

DETAILED DESCRIPTION

Figure 1:
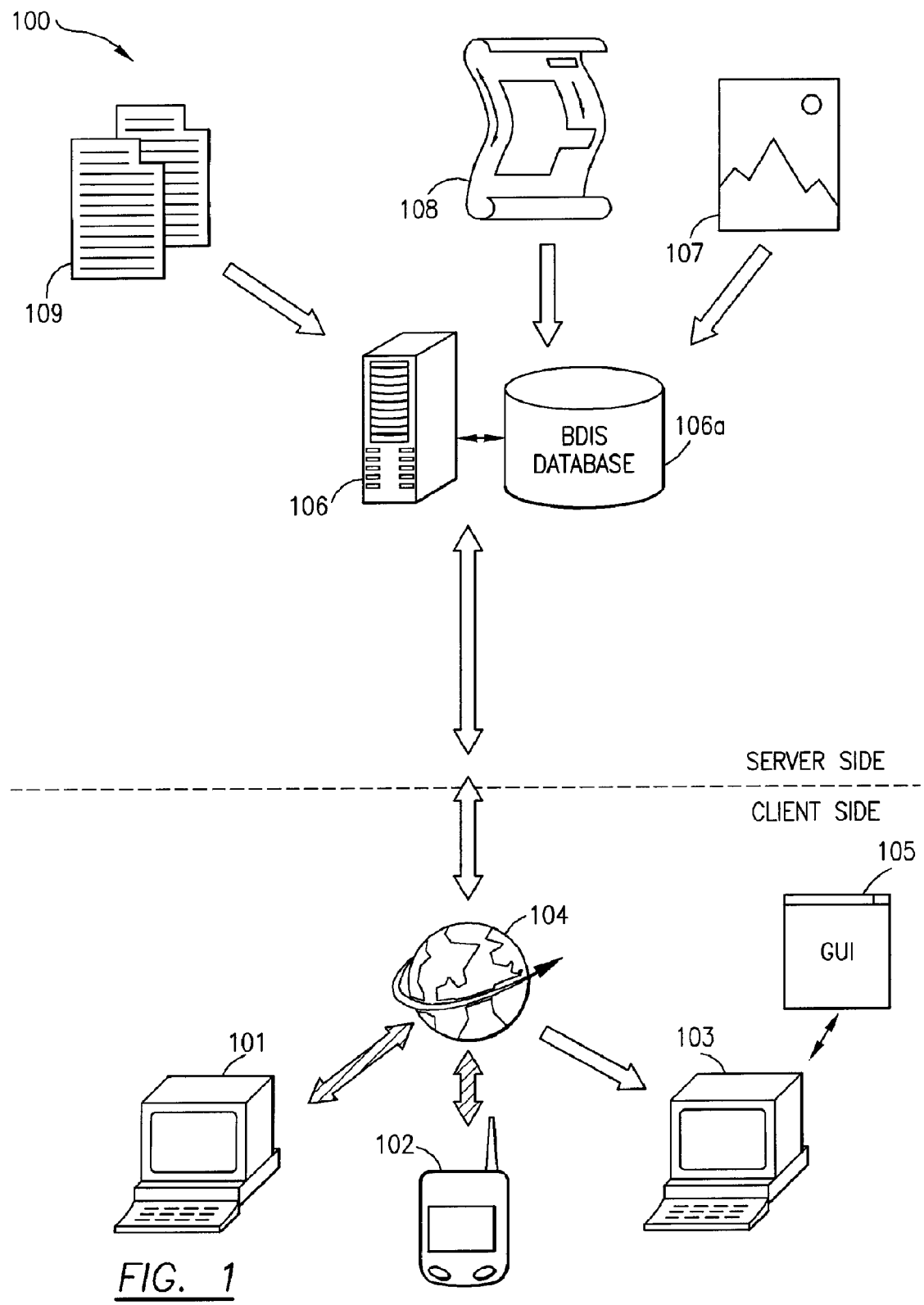
FIG. 1 shows a general process flow according to the present invention.

Referring now to FIG. 1, a system overview of the BDIS system 100 is shown. The system is depicted with server side and client side views. On the server side, a server/BDIS database 106 stores various data to be accessed by system users via the internet 104. The data stored on the BDIS database 106a includes property data 109, design plans 108 and inspection photographs 107. The data stored on the BDIS database 106a may be uploaded at a municipal building department facility or via the internet through system users and/or departmental officials. System users are depicted on the client's side of the BDIS 100 overview. Departmental building officials 101 may access the BDIS database 106a via the internet or through system connections at the building department municipality office. A field inspector may use a field device 102 to access and to upload various data onto the BDIS database 106a via the internet 104. Other system user includes property owners and contractors 103 who also may enter data and access data via the internet 104 as stored on the BDIS database 106a. The system users may access the BDIS database 106a by using a graphical user interface 105 that includes various pull down menus and icons for quick access and input. The initial screen on the graphical user interface 105 is a log on screen where a system user inputs user names and access codes in order to gain access to the BDIS database 106a. Each system user would have specific database rights and an access profile. A system user's access may be limited to specific properties related to the system user and the functions necessary for the user to carry out BDIS activities. Access to the BDIS database 106a allows system users to download the property data 109, design plans 108 and any related inspection photos 107. Also, the field inspectors may supplement the BDIS database with additional photographs and property data. The system allows a property owner/contractor 103 to check for inspection results, code enforcement violations, review plans, in PDF formats, and add comments as necessary. Advantageously, the property owners/contractors 103 may also schedule field inspections for specific projects. Essentially, all system users gain access to various data from the BDIS system in a fairly user-friendly and readily accessible environment. Such data includes legal information such as legal description and lot number, tax data, inspection statuses or process statuses, permit information, code enforcement violations and general property data related to properties stored within the database.

Figure 2:
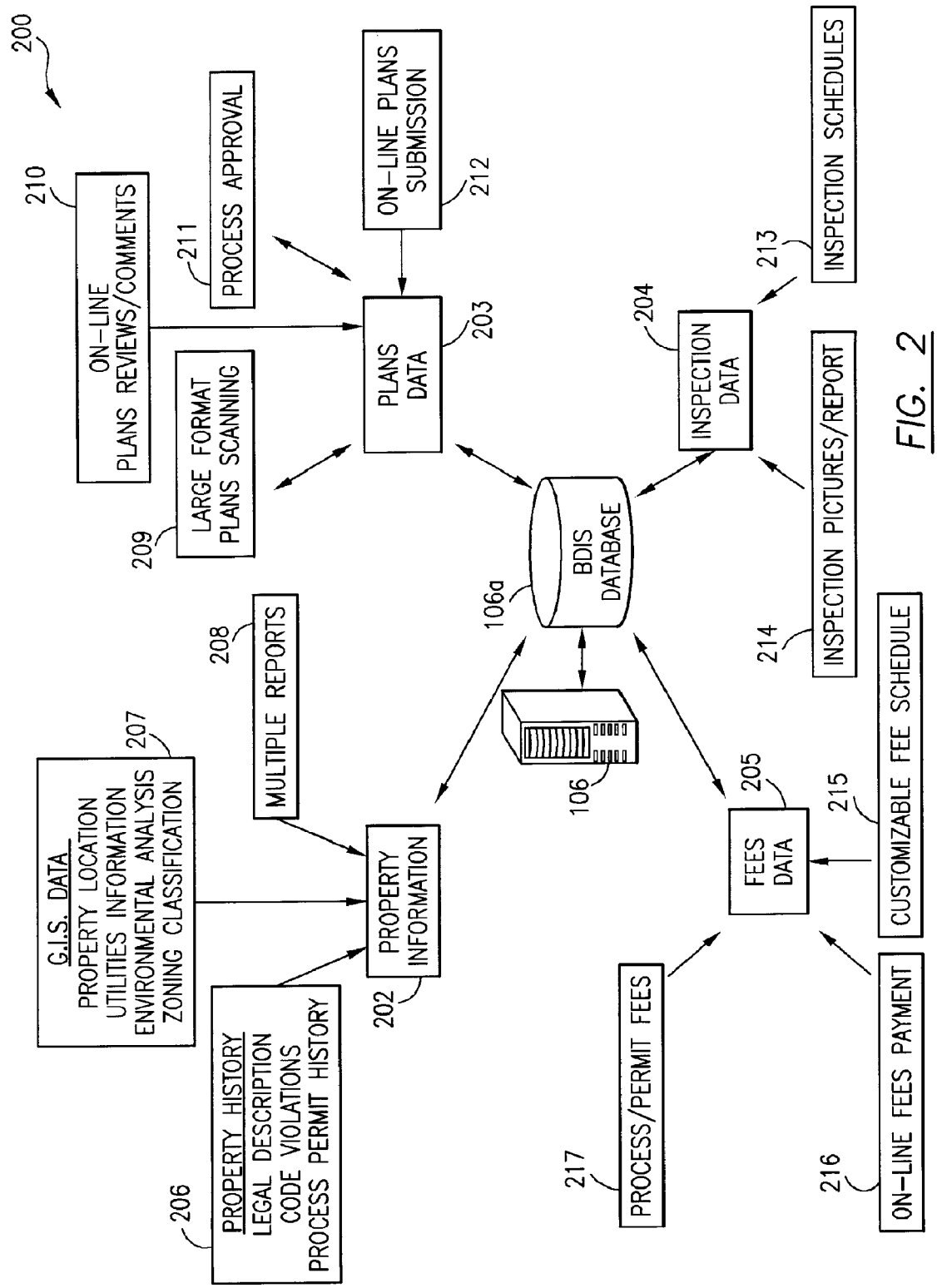
FIG. 2 shows an overview of the BDIS features according to the present invention.

Referring now to FIG. 2, a more detailed overview of the BDIS database is displayed. As shown in FIG. 2, data related to four subject areas may be stored upon the BDIS database 106a. Data related to general property data 202, plans data 203, fees data 205 and inspection data 204 are all stored on the BDIS database 106a. Property data 202 includes property history 206, G.I.S. data 207 and multiple reports 208. The planning related data 203 includes scanned documents 209, plan reviews and comments 210, process approvals 211 and submission documents 212. In relation to fees 205, the three principal fees may include process/permit fees 217, fee payment status 216 and any customized fee schedules 215 related to specific inspections and/or plan requests. In the area of an inspection data 204, the BDIS includes inspection pictures and reports 214 and inspection schedules 213.

The property history 206 includes specific items such as legal description, tax information, code violations and permit histories. The violations may also include any photographs of the violations themselves and any subsequent repairs in relation to the code violations. Accordingly, the property data 202 would also include a geographical information system (G.I.S.) where items such as the property's location, utilities used, any environmental data and zoning classifications are stored. The BDIS database 106a provides any building official with access to multiple reports and plans related to any property within the municipality's jurisdiction. Building officials may also check for fees and inspection records in relation to property data within the BDIS database. Inspectors may advantageously use the system to review scheduled inspections, report inspection results and to upload any photographs associated with the properties.

Any plans associated with the properties stored in the BDIS system are stored in Adobe PDF format and readily accessible by building officials, owners/contractors and any building inspectors. The PDF format allows users to view the plans that are readily available for downloading on any users' computers. Also, any plan reviewers may insert comments within the PDF file that are legible and accurate and, therefore, eliminating any problems related to handwritten notes. The BDIS database system minimizes the papers associated with any municipal building department, allows easy access and creates opportunities for greater efficiency in relation to the building department. The BDIS system efficiency is particularly prominent in regard to the handling of plans. A user submits a set of plans associated with a building construction project to the municipality for approval. If any changes are necessary after review by the plan reviewers, then the user must submit an entire new set of plans with changes and comments. Furthermore for each subsequent revision, the user must submit a complete new set of plans. The BDIS avoids the development of this potential paper log by allowing the user to upload revisions electronically and thus avoid the resubmission of hard copies of subsequent plans. The BDIS system therefore speeds up any plans processing procedures associated with the particular building department.

Owners/contractors can submit plans via the internet and then receive issued permits also via the internet. Inspections may be scheduled on-line by the owner/contractor and then inspectors post the inspection results which the owner/contractor may retrieve at any time. Any fees required for any specific process or permits may also be readily tracked and paid via the BDIS system. The BDIS system includes an on-line fee payment feature that allows owners/contractors to submit payment for any necessary permits and inspections. Also, building officials may readily keep track of all records related to payments and assess any code violation fees via the system. The BDIS system keeps the users thereof readily advised of fee amounts that may be associated with the various permits for a building project. Fees associated with the permits can vary such as flat fees, fees based on square footage or constructor estimates and/or building types. The BDIS system advantageously calculates changes and additional fee requirements based on the periodic updates supplied by users. The BDIS system essentially eliminates mathematical and clerical mistakes through the automation of fee calculation.

Figure 3:
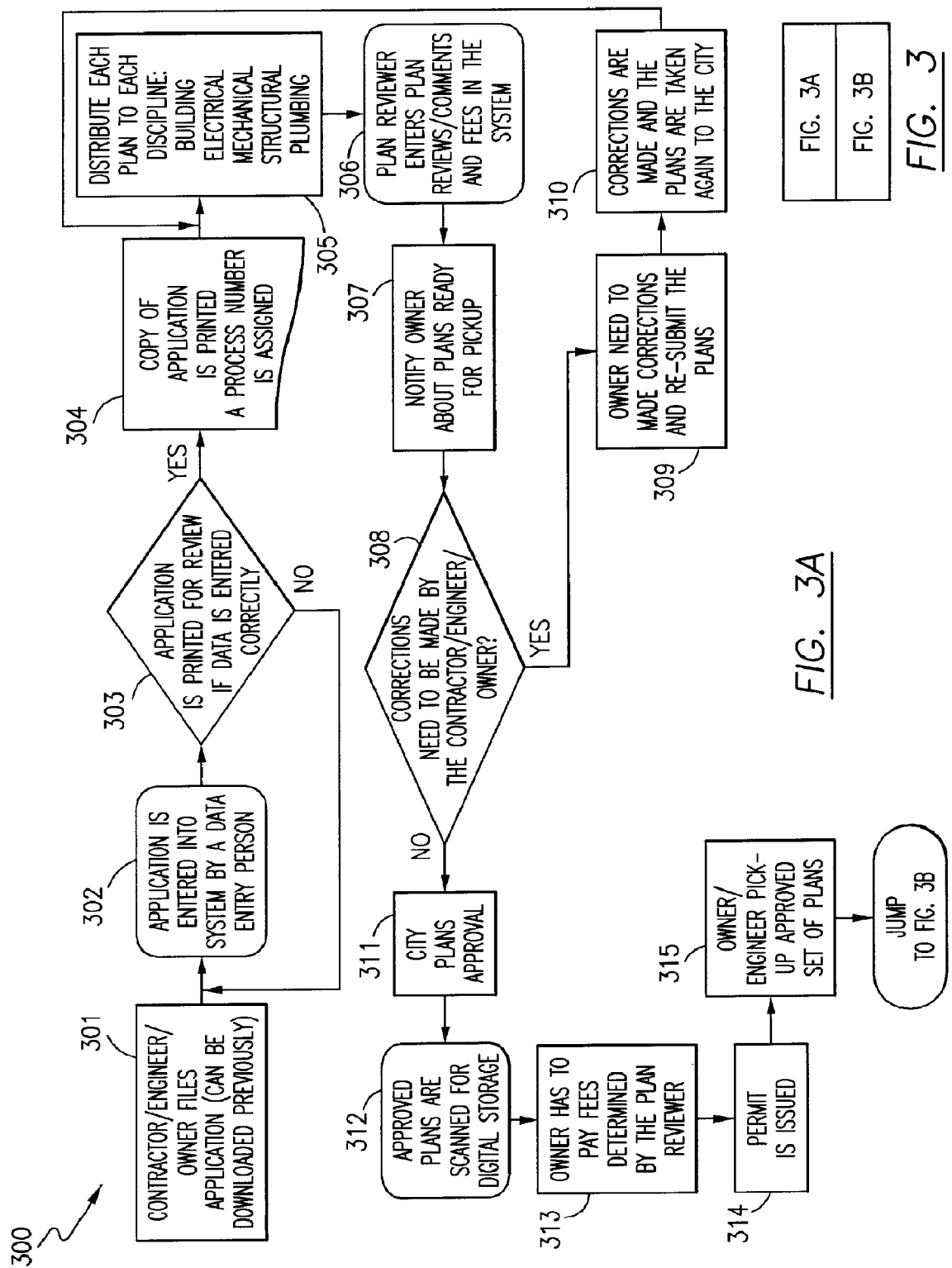
FIG. 3A shows an exemplary plans processing flow according to the present invention.
FIG. 3B shows a continuation of the plans processing flow according to the present invention.
Figure 3B:
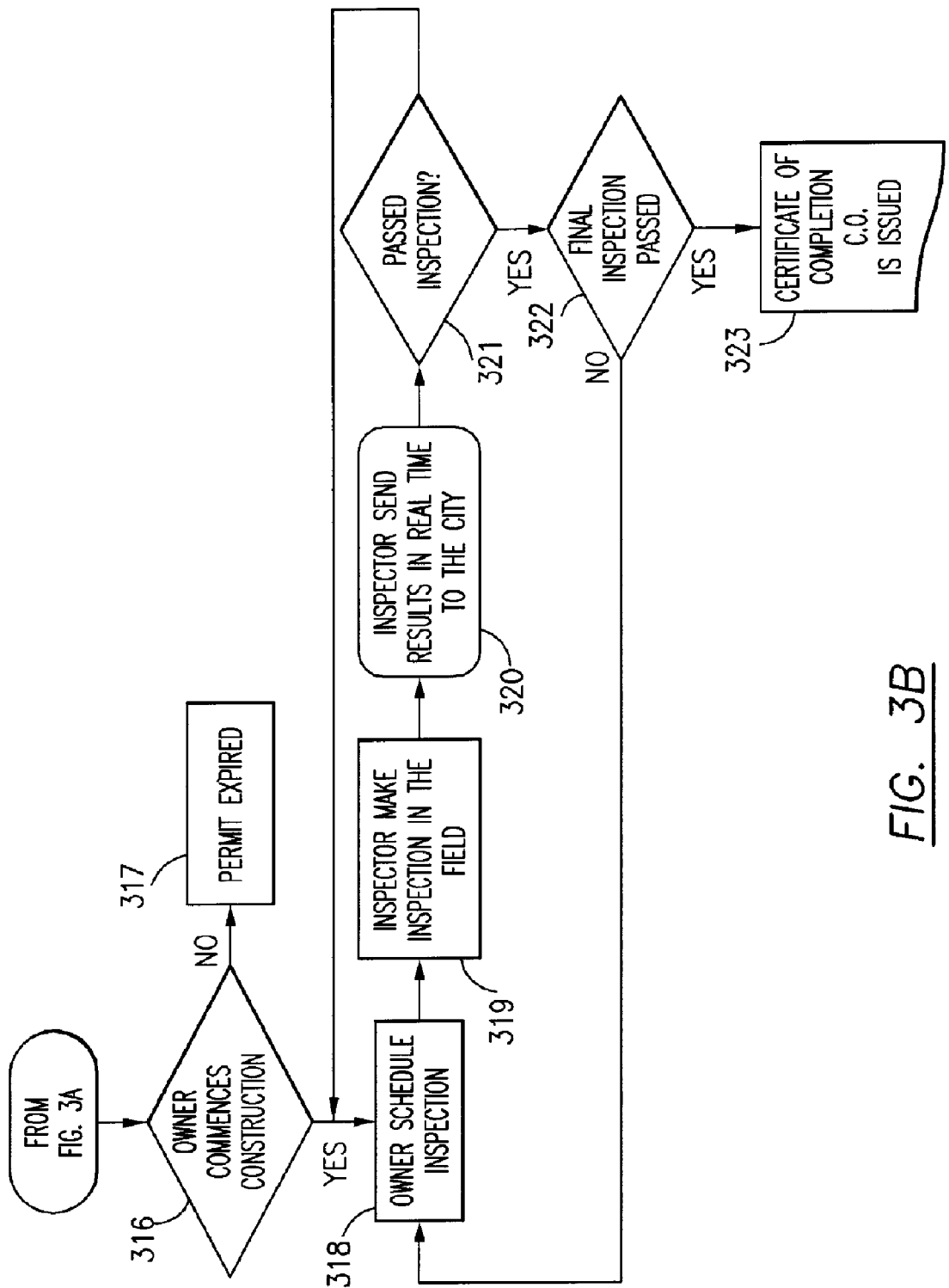

Referring now to FIGS. 3 (3A & 3B), a diagram of the BDIS system process is displayed. FIG. 3 shows an exemplary process as envisioned by the BDIS plans processing flow. Initially, a contractor/owner files an application 301. A data entry person enters the application into the system, 302. The user may then print a copy of the application for review, 303 and a copy of the application is printed with a process number is assigned to it, 304. Each discipline associated with the submitted plan application receives a copy of the application, 305. The plan reviewer enters any comments regarding the plans and issues associated fees, 306. Once the plan reviewer has entered the information into the system, the user receives notification that the plans have been reviewed and that are ready to be picked up, 307. If any corrections are needed within the plans, the plan reviewer posts comments within the plans, 309. The user may then make any necessary corrections and resubmit the plans for further review by the plan reviewers 310. Once the user receives approved plans 311, the plans are scanned digitally for storage on the BDIS database 312. A user, after the fees have been determined, may submit payment of the fees via the BDIS system 313 and then the BDIS system, of course, issues an electronic permit 314. After the permit has been issued, a user may pick up the approved set of plans 315 and then commence construction in accord with the municipality's building code 316.

Once the user has commenced construction, the user then can log back into the BDIS system and schedule inspections by building inspectors with the municipality 318. Accordingly, building inspectors review the BDIS system on a daily basis in order to schedule inspections 319. Once the inspection is complete, the inspector submits the results via the BDIS system 320 and transmits notice to the user. The status of the various inspections that may be associated with a project may be continuously reviewed by the system, 321. The system may transmit periodic alerts to users regarding the status of the inspections. Upon completion of the final inspection 322, the inspector submits a certificate of completion for the designated building 323.

Figure 4:
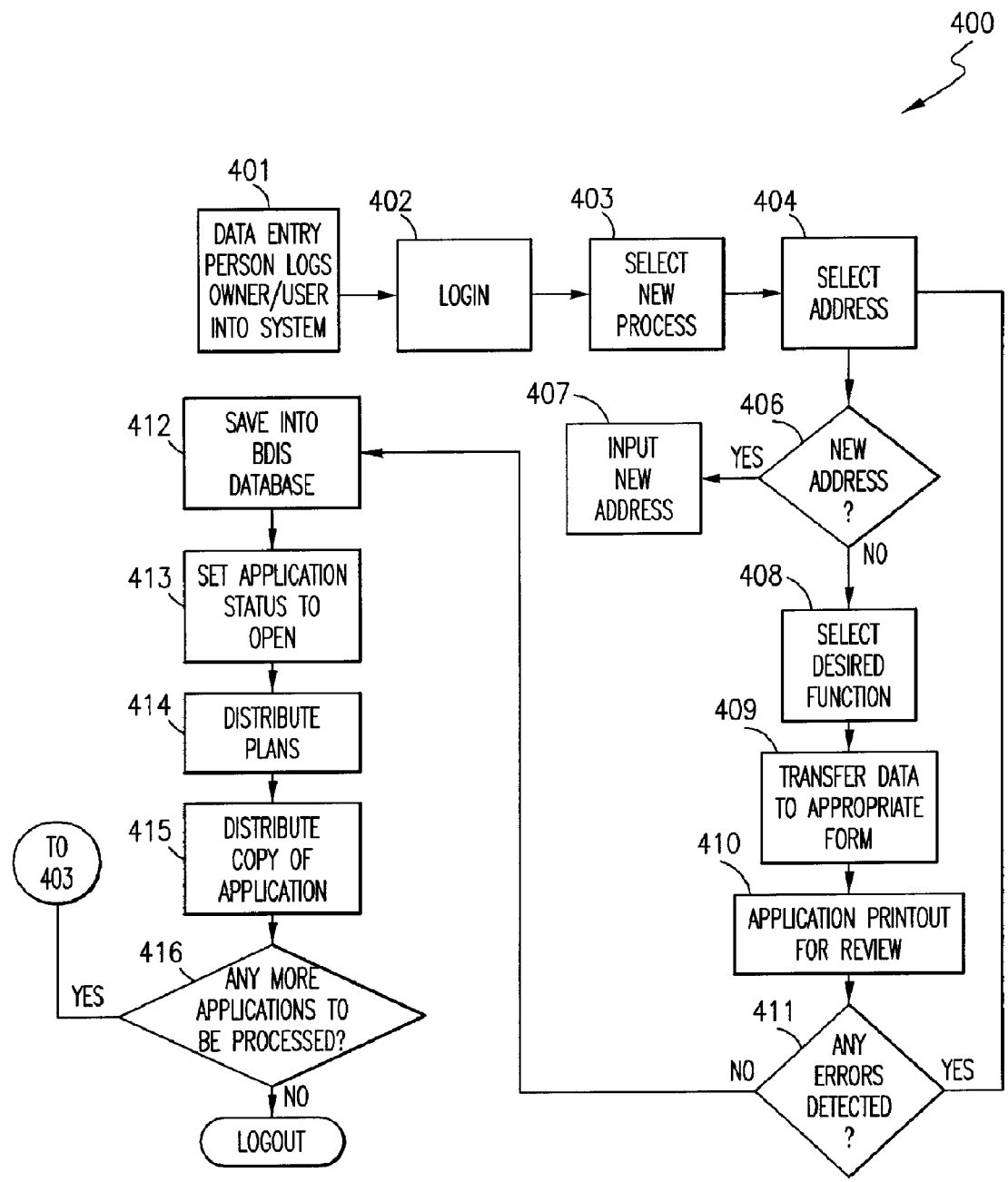
FIG. 4 shows a data flow for a process application according to the present invention.

Referring now to FIG. 4, a general overview of the application processing steps is shown. The process shown in FIG. 4 relates to an application that may be physically filed by a user and then submitted to a city clerk for entry upon receipt from the user. Within this particular process, the user does not log directly into the system but a data entry person with the municipality enters the data associated with the application by logging into the BDIS system 402. Similar to FIG. 3, a data entry person logs onto the system, 401, 402, in order to input the application into the system and the appropriate data associated with the application such as the address 404, 406, 407, selection of the type of property 403, the desired permit 408 and the specific construction. As in FIG. 3, once all data related to the application is entered and transferred to the appropriate form 409, the application is printed out for review by a reviewer 410. The complete application is submitted to various disciplines for review for proper permits and to detect any errors, 411. If any errors exist then the application is sent back for correction and additional review. If no errors exist then the application is saved in the BDIS database, 412. The system makes the application available for review via the BDIS system, 413. Plans that may accompany the application are distributed to each appropriate design department, 414. The system also distributes a copy of the application to the owner/user, 415. The system then checks to see if the data entry person desires to process any further applications, 416. A copy of the completed application is then distributed to the user who submitted the handwritten application, 415.

Figure 5B:
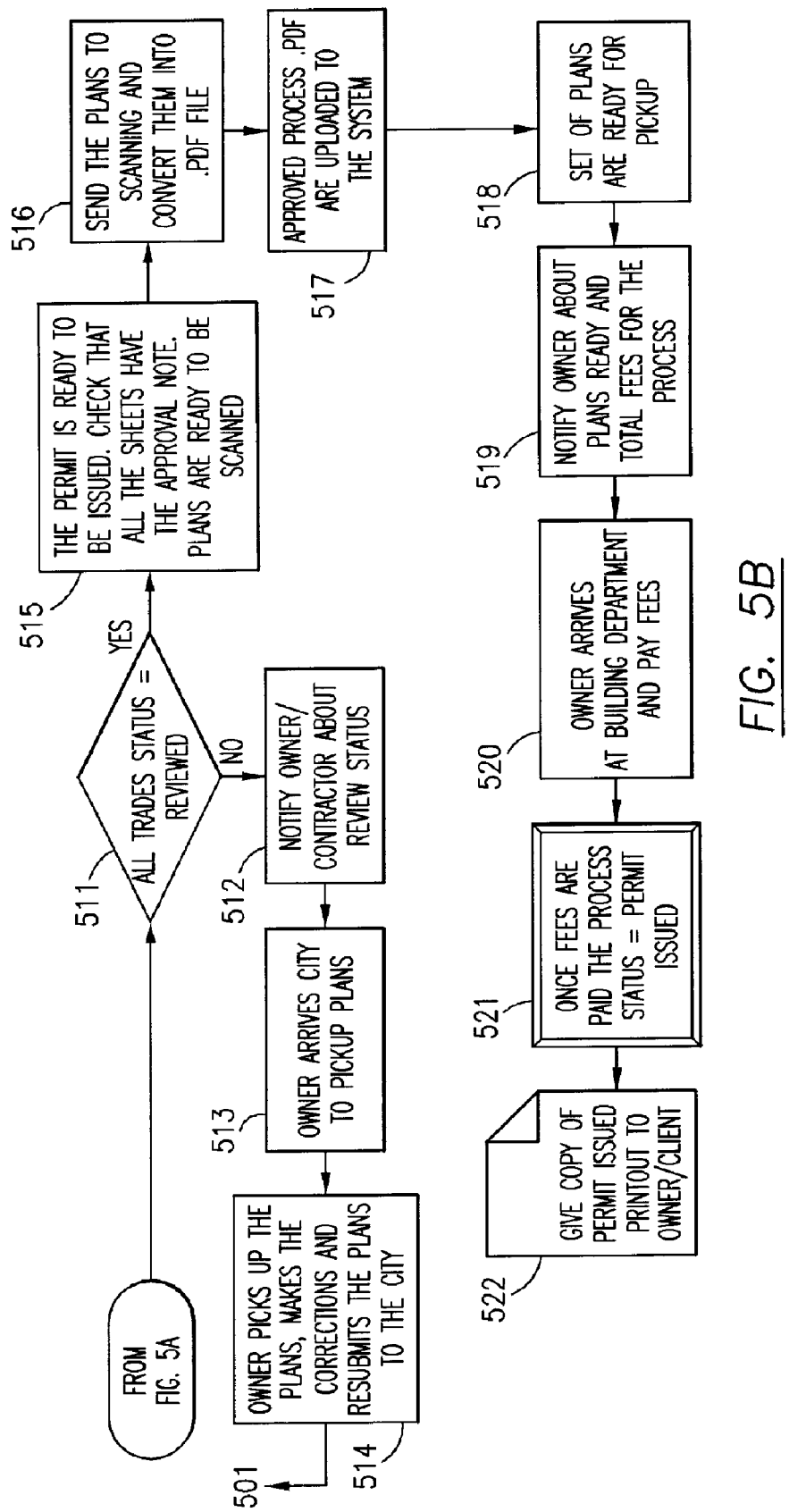
FIG. 5B shows a continuation of the plans review process for fee assignment according to the present invention.

Referring now to FIG. 5 (5A & 5B), a detailed overview of the plans review processing steps is displayed. A plans reviewer receives an application for review, 501, and then logs into the system as a plan reviewer, 502. The plan reviewer examines a set of plans and verifies if any comments, such as code compliance or design notes, are necessary in regards to a specific building trade, 504. If the plans do not require any comments then the reviewer designates that the plans have been reviewed, 505. The reviewer then reviews a process menu in order to assign fees associated with the plans, 508. After the reviewer selects the appropriate fees, the system attaches the fee requirements with the plans, 509. The plan reviewer logs out of the system, 510, after the system attaches the process fees to the designated plans.

The plans are then sent to the specific building trades to review for comments related to the specific building trade 511. After all trades have reviewed the plans and no further comments need to be addressed, then a permit is issued that all building plans have been approved, 515. If any trade review creates a need for further comments, then the owner/contactor receives notice regarding the status of the plans, 512. The owner/contractor may then pick up plans, 513 and make necessary corrections for resubmission to the respective municipality, 514. After all building plans are approved, the plans are then sent to be scanned and converted into a PDF file, 516. Once the approved plans are scanned, a system administrator then uploads the plans into the system 517. Once on the system, the plans are designated as ready for pick up, 518, with the total fees associated with the building permits. In addition to PDF files of the plans, the BDIS system submits a notification to the user concerning the review status, 519. Certain trades may complete review sooner than others and the user is always kept abreast of the status of the plans during the review process, 512, 519. The user may then return to the municipality's office and submit payment of fees, 520. The system then indicates that all fees are paid and issues a building permit 521. After the system issues the permit, the owner/contractor may receive a hard copy print out of the building permit, 522.

Figure 6:
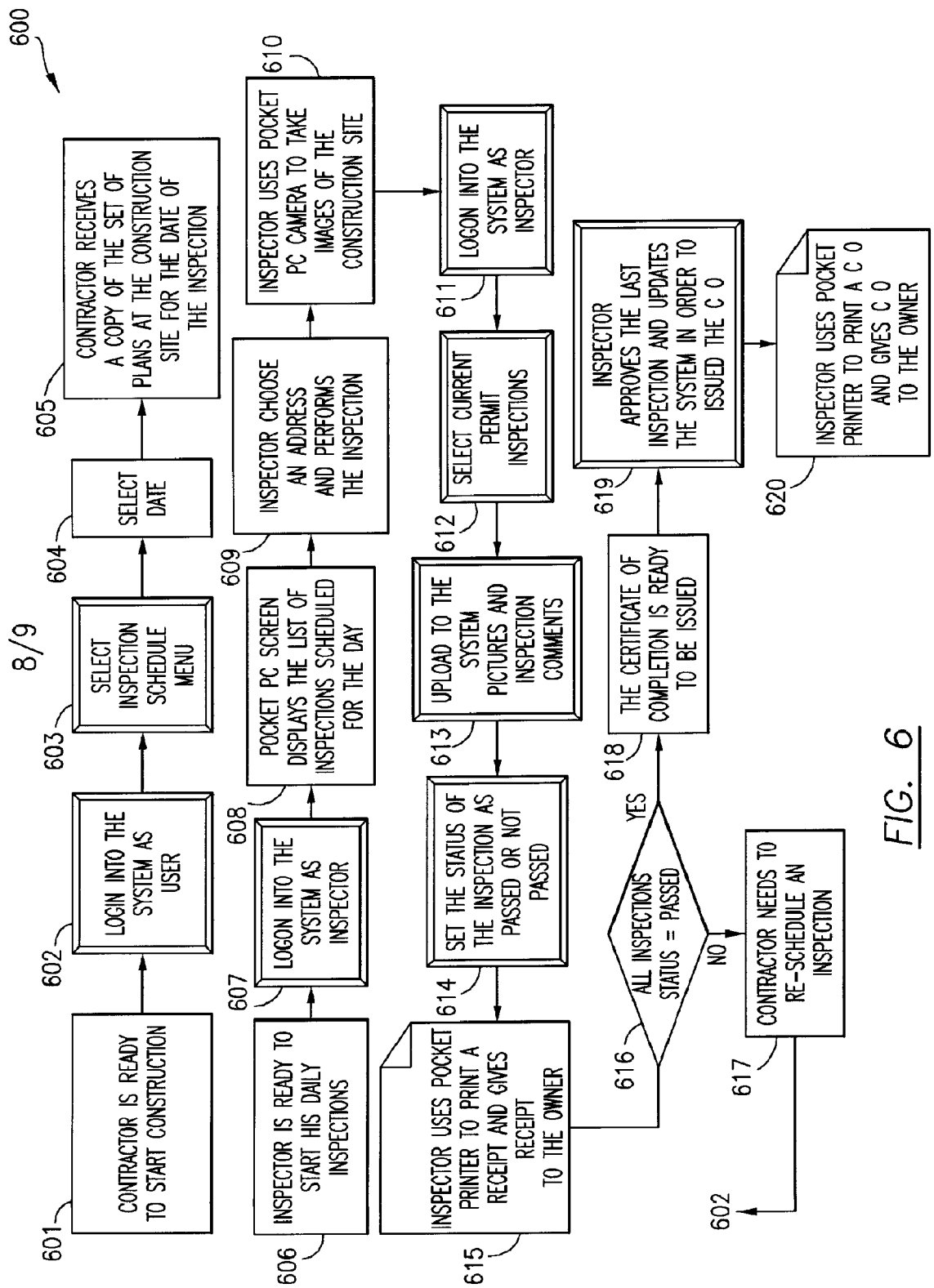
FIG. 6 shows an inspection process according to the present invention.

Referring now to FIG. 6, an extensive overview of the inspection process is shown. Once the contractor is ready to start construction, 601, the contractor may log into the BDIS system as a user. As construction progresses, a user may log onto the inspection schedule menu, 603 and schedule dates for inspection, 604. On the date of inspection, the user may retrieve a copy of any set of plans related to the construction, 605. When the inspectors are ready to start their daily inspections, 606, each inspector using the BDIS system may routinely log onto the system as an inspector, 607. The inspector receives information regarding scheduled daily inspections, via a handheld computing device, such as a PDA, cellphone, or combination thereof, or portable laptop computer, 608. After receiving the list of scheduled inspections, the inspector may choose an address from the list of scheduled inspections, 609. Once on the construction site, the inspector may record the results of the inspection on the portable computing device and may take electronic photographs of the construction site, 610. After the inspection, the inspector may then log back into the system to submit current inspection results, 611, which would include the uploading of any pictures, inspection comments and/or inspection reports 612, 613. Included in the inspection results, the inspector designates the status of the inspection as passed or not passed, 614. While on the job site, the inspector may print a receipt to give to the owner, 615. The status of the inspection may then be viewed by the user on the system as either passed or not passed, 616. Once all inspections have reached the status of passed, a certificate of completion may be issued in due course 618. The inspector may also readily review the status of all inspections on the system and may instantly approve any final inspections in order to issue the certificate of completion, 619. The inspector may then print a certificate of completion at the construction site upon the completion of the final inspection, 620. Once the certificate of completion is issued, a user may readily access the certificate via the BDIS system. Also, if any rescheduling of inspections is needed, the user may merely reschedule these inspections via the BDIS system, 617.

Referring now to FIG. 7, an overview of the user connection to the BDIS system is shown. Typically, a user may use a desk top or lap top computer 701 and access the BDIS system via the computer and a "thin" client like an Internet browser. Once logged onto the system, the user views a graphical user interface (GUI) 702 in order to log into the system and then may retrieve or submit data into the system. Typically, the GUI 702 displays the plans review comments 703, process fees 704, scanned plans 705, scheduled inspections 706 and any real-time results 707 that may be available. The graphical interface accordingly includes pull down menus and shortcut icons associated with the various databases and functions that are available in the BDIS system.

Referring now to FIG. 8, an overview of the data exchange associated with inspectors is shown. Ideally, field inspectors may use a pocket PC in order to connect to the BDIS system and exchange data as needed for field inspections. Similarly, as with the users, a depiction of a pocket PC 801 is shown that includes a menu screen 802. The field inspectors may log into the BDIS system via the menu screen 802 and access various information or data stored in the BDIS database. Field inspectors may view photographs, diagrams or comments 804, property address selections, 803 and various building code issues, 805. Advantageously, the inspectors may upload inspection reports, photographs and any related data via the upload screen 806. This tool allows field inspectors to work more efficiently and to avoid errors that may be associated with paper documents. The pocket PC 801 may also include digital camera and cell phone functionality to even further expand the efficiency associated with the inspections.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system comprising a processor configured to facilitate a building department of a municipality's management and administration of its operations over an electronic data transfer network, and further comprising:

at least one server connected to an electronic data transfer network, said server capable of transmitting and receiving electronic data over said electronic data transfer network;

one or more computing devices capable of accessing electronic data on said server, inputting electronic data onto said server and receiving electronic data from said server over said electronic data transfer network;

a relational database residing on said server, wherein said database provides a virtual structure which a plurality of building department data can be stored in and retrieved from, said building department data including (1) general property data, where said property data includes a unique property identifier, geographic location data, property history data, utilities data, environmental data, and zoning data, (2) municipal fee data, (3) municipal building code data, (4) building project permit application data, (5) building project plan data, where said plan data includes written plans of the building project, (6) building project permit plan review data, where said plan review data includes proposed revisions or comments pertaining to said plan data, (7) building project permit approval data, (8) building project inspection scheduling data, (9) building project inspection result data, where said inspection result data includes inspection pictures and inspection reports, and (10) building project certification data, where said certification data includes data pertaining to the issuance of certificates of completion;

a database engine embodied in one or more executable software programs residing on said server, wherein said engine manages the receipt, storage, manipulation, and output of building department data residing in the database, wherein said engine includes (1) an access software component for restricting database access based on a users specific database rights, (2) a storage software component, a permit application software component for organizing building department data within the database, where organizing includes using the unique property identifier for associating related building department data within the database and facilitating the tracking of building department data within the database, (3) a permitting software component for determining all municipal building codes data associated with a particular building project permit application data, associating the municipal fee data relevant to particular building project permit application data, accessing building project permit plan data pertaining to particular building project permit application data, receiving and associating comments directed to particular building project permit application data, confirming the compliance of particular building project permit application data and the associated building project permit plan data with relevant municipal building code data and relevant municipal fee data, approving permits, storing said permit approval data into said database, and accessing said permit approval data, (4) an inspection software component to access and manipulate building inspection scheduling data and building inspection result data for receiving and posting inspection schedule requests, receiving comments and photographs from an inspection, posting receiving and posting inspection reports, and automatically transmitting inspection status alerts, (5) a fee software component that utilizes relevant municipal fee data for assessing fees, calculating fees, and accepting fee payments, (6) certificate software component that receives certificates of completion, stores said certification data into said database, and accesses said certification data;

said access software component managing user access to the system by providing a unique access profile for every building department system user, each access profile being assigned a predetermined level of database rights;

said levels of database rights including at least a first and a second level of database rights, the first level allowing the user to access at least general property data, municipal fee data, municipal building code data, and building project inspection scheduling data and the second level allowing the user to access all building department data and all components in the database engine;

said storage software component sorting building department data within the database by assigning one unique property identifier to each property in the municipality and linking all other building department data in the database pertaining to the property associated with said unique property identifier, organizing input data by linking the data that is input to the property associated with the unique property identifier to which the data that is input pertains, and retrieving data that is requested by any component in the database engine from the database by providing all data that is requested associated with the unique property identifier to which the data that is request pertains;

said permit application software component receiving input with building project permit application data from applications and providing said building project permit application data to said storage software component, the fee software component and the permitting software component;

said permitting software component, when building project permit application data is received, requesting all municipal building code data for the subject building project permit application data from the storage software component, receiving building project permit plan data input pertaining to the subject building project permit application data, providing said building project permit review data input to the storage software component, and providing building project permit approval data input to the storage software component, said fee software component retrieving the municipal fee data pertaining to the subject building project permit application data from the storage software component;

said inspection software component receiving said building project inspection scheduling data input, providing said building project inspection scheduling data to the storage software component, retrieving building project inspection scheduling data from the storage software component, receiving said building project inspection result data input, and providing said building project inspection result data input to the storage software component;

said certificate software component receiving building project certification data input, providing said building project certification data input to the software storage component, and retrieving said building project certification data input from the software storage component;

means for completing an electronic permit application for a designated property;

means for transmitting the electronic permit application to a server via a network;

means for assigning a unique property identifier to the permit application;

means for linking the electronic permit application to the designated property via the unique property identifier;

means for distributing the permit application for review by designated reviewers;

means for transmitting permit application results to permit application originators;

means for transmitting permit application fee payment transactions to the server;

means for issuing an electronic permit to the permit application originator;

means for linking the electronic permit to the permit application and designated property via the unique property identifier; and a graphic user interface where the graphic user interface provides at least one distinct portal from which building department data on said database can be accessed and through which said database engine can be actuated.

* * * * *